US012645955B2

(12) United States Patent　　　　(10) Patent No.: US 12,645,955 B2
Chatterjee et al.　　　　　　　　　(45) Date of Patent: Jun. 2, 2026

(54) MACHINE LEARNING ENABLED SUPPLIER DATA ASSOCIATION

(71) Applicant: SAP SE, Walldorf (DE)

(72) Inventors: Snigdhaman Chatterjee, Bangalore (IN); Saket Agrahari, Bangalore (IN)

(73) Assignee: SAP SE, Walldorf (DE)

( * ) Notice: Subject to any disclaimer, the term of this patent is extended or adjusted under 35 U.S.C. 154(b) by 1061 days.

(21) Appl. No.: 17/529,584

(22) Filed: Nov. 18, 2021

(65) Prior Publication Data

US 2023/0153644 A1　　May 18, 2023

(51) Int. Cl.
*G06N 5/025*　　　(2023.01)
*G06N 5/04*　　　(2023.01)
*G06Q 10/0631*　　(2023.01)

(52) U.S. Cl.
CPC .............. *G06N 5/025* (2013.01); *G06N 5/04* (2013.01); *G06Q 10/06315* (2013.01)

(58) Field of Classification Search
CPC ........... G06N 5/025; G06N 5/04; G06N 5/01; G06N 7/01; G06N 20/10; G06N 20/20; G06N 20/00; G06Q 10/06315; G06Q 10/087
See application file for complete search history.

(56) References Cited

U.S. PATENT DOCUMENTS

| | | | | |
|---|---|---|---|---|
| 10,147,108 B2 * | 12/2018 | Ayzenshtat | ........ | G06Q 30/0204 |
| 2009/0163183 A1 * | 6/2009 | O'Donoghue | ...... | H04M 7/0024 455/414.1 |
| 2010/0174670 A1 * | 7/2010 | Malik | ................... | G06F 18/231 706/12 |

OTHER PUBLICATIONS

Felix "Mining Retail Outlet Transaction Data" dated Aug. 2011 and retrieved from https://erepository.uonbi.ac.ke/bitstream/handle/11295/3545/Odek_Mining%20Retail%20Outlet%20Transaction%20Data.pdf?sequence=1&isAllowed=y (Year: 2011).*
Ergenç "Frequent Pattern Mining under Multiple Support Thresholds", published in Wseas Transactions on Computer Research vol. 4, 2016 (Year: 2016).*
Ciortan "An introduction to frequent pattern mining research, Summary of Apriori, Eclat and FP tree algorithms" retrived from https://medium.com/@ciortanmadalina/an-introduction-to-frequent-pattern-mining-research-564f239548e dated Jun. 2019 (Year: 2019).*

(Continued)

*Primary Examiner* — Sanchita Roy
(74) *Attorney, Agent, or Firm* — Mintz Levin Cohn Ferris Glovsky and Popeo, P.C.

(57)　　　　　　　ABSTRACT

A method may include receiving a user input specifying one or more attributes. In response to the receiving the user input, a machine learning model may be applied to identify, within a supplier data stored in a database, one or more frequent itemsets containing the one or more attributes. The machine learning model may be a frequent pattern (FP) growth tree generated based on the supplier data stored in the database. A supplier having the one or more attributes may be identified based on the one or more frequent itemsets. The supplier data may include numerous contracts and/or sourcing events. As such, the supplier having the one or more attributes may be identified by leveraging the supplier data associated with the contracts and/or sourcing events. Related systems and computer program products are also provided.

11 Claims, 6 Drawing Sheets

(56)            References Cited

OTHER PUBLICATIONS

Lin et al "Linguistic data mining with fuzzy FP-trees" Expert
Systems with Applications vol. 37, Issue 6, Jun. 2010, pp. 4560-
4567. (Year: 2010).*
Ciortan (Year: 2019).*
Ergenc (Year: 2016).*
Lin (Year: 2010).*

* cited by examiner

100

125

| Tr ID | = | {items} |
|-------|---|---------|
| $T_1$ | = | {A,B,E} |
| $T_2$ | = | {B,D} |
| $T_3$ | = | {B,C} |
| $T_4$ | = | {A,B,D} |
| $T_5$ | = | {A,C} |
| $T_6$ | = | {B,C} |
| $T_7$ | = | {A,C} |
| $T_8$ | = | {A,B,C,E} |
| $T_9$ | = | {A,B,C} |

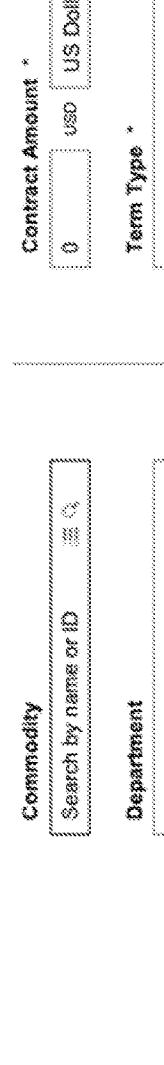
300
Enter Required Info
Contract Amount *
0    USD    US Dollar
Term Type *
Select a term type
Effective Date *
MM/DD/YY
Expiration Date *
MM/DD/YY
Commodity
Search by name or ID
Department
Search by name or ID
Region *
Search by name or ID
Supplier *
IBM ITALIA SERVIZI FI...(IBM ITALIA SER
Cancel     Previous     Next
Commodities :Strain Gauge
Commodities :Silicon Chips
FIG. 3

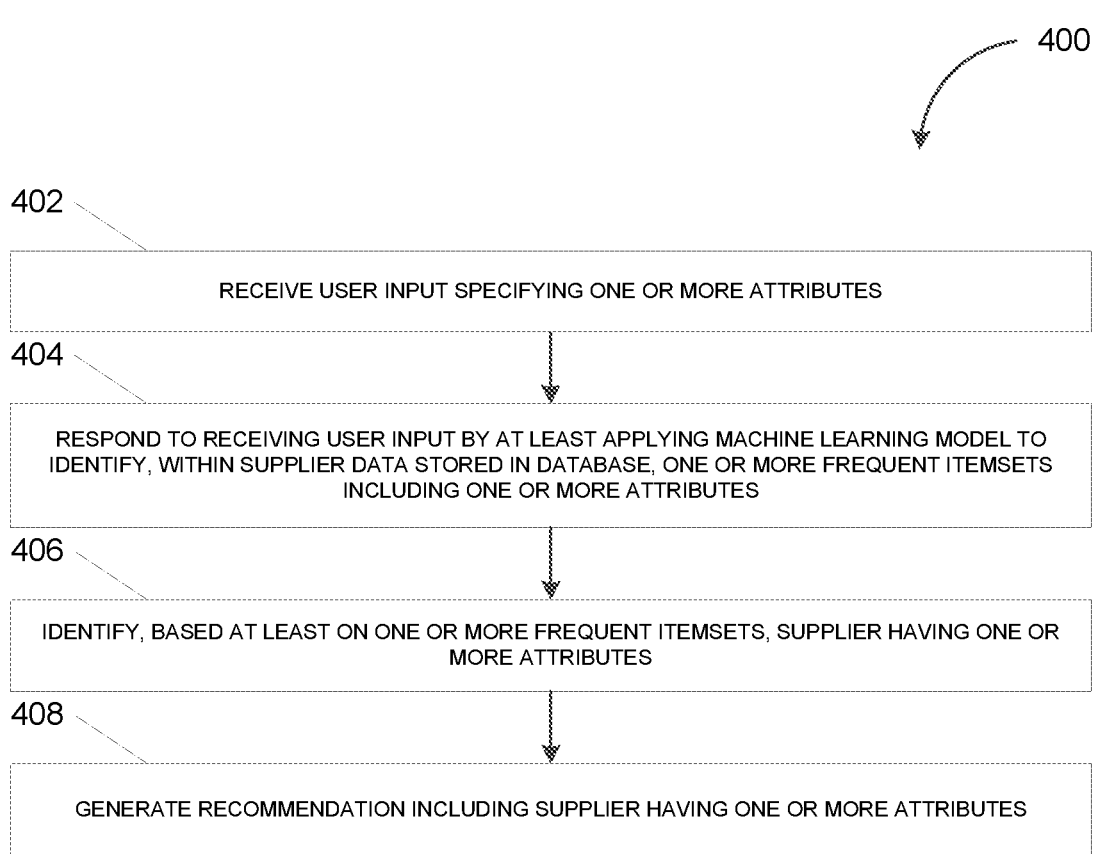

400

402

RECEIVE USER INPUT SPECIFYING ONE OR MORE ATTRIBUTES

404

RESPOND TO RECEIVING USER INPUT BY AT LEAST APPLYING MACHINE LEARNING MODEL TO IDENTIFY, WITHIN SUPPLIER DATA STORED IN DATABASE, ONE OR MORE FREQUENT ITEMSETS INCLUDING ONE OR MORE ATTRIBUTES

406

IDENTIFY, BASED AT LEAST ON ONE OR MORE FREQUENT ITEMSETS, SUPPLIER HAVING ONE OR MORE ATTRIBUTES

408

GENERATE RECOMMENDATION INCLUDING SUPPLIER HAVING ONE OR MORE ATTRIBUTES

FIG. 4

MACHINE LEARNING ENABLED SUPPLIER DATA ASSOCIATION

TECHNICAL FIELD

The subject matter described herein relates generally to machine learning and more specifically to a machine learning enabled technique for generating association rules for supplier data.

BACKGROUND

An enterprise may rely on a suite of enterprise software applications for sourcing, procurement, supply chain management, invoicing, and payment. These enterprise software applications may provide a variety of data processing functionalities including, for example, billing, invoicing, procurement, payroll, time and attendance management, recruiting and onboarding, learning and development, performance and compensation, workforce planning, and/or the like. Data associated with multiple enterprise software applications may be stored in a common database in order to enable a seamless integration between different enterprise software applications. For example, an enterprise resource planning (ERP) application may track resources, such as cash, raw materials, and production capacity, and the status of various commitments such as purchase order and payroll. In the event the enterprise interacts with large and evolving roster of external vendors, the enterprise resource planning (ERP) application may be integrated with a supplier lifecycle management (SLM) application configured to perform one or more of supplier identification, selection and segmentation, onboarding, performance management, information management, risk management, relationship management, and offboarding.

SUMMARY

Systems, methods, and articles of manufacture, including computer program products, are provided for machine learning enabled data association. In some example embodiments, there is provided a system that includes at least one processor and at least one memory. The at least one memory may include program code that provides operations when executed by the at least one processor. The operations may include: receiving a user input specifying one or more attributes; in response to the receiving the user input, applying a machine learning model to identify, within a supplier data stored in a database, one or more frequent itemsets containing the one or more attributes; identifying, based at least on the one or more frequent itemsets, a supplier having the one or more attributes; and generating a recommendation including the supplier having the one or more attributes.

In some variations, one or more features disclosed herein including the following features can optionally be included in any feasible combination. The machine learning model may include a frequent pattern (FP) growth tree.

In some variations, the operations may further include: generating, based at least on the supplier data, a head table that includes, for each item of a plurality of items included in the supplier data, a total support corresponding to a quantity of transactions including the item; and generating, based at least on the head table, the frequent pattern (FP) growth tree.

In some variations, the frequent pattern growth tree may be generated through a single pass of the supplier data included in the database.

In some variations, the generating of the frequent pattern growth tree may include inserting, for a first transaction included in the supplier data, a first node for a first item included in the transaction and a second node for a second item included in the transaction. The first node may be inserted before the second node based at least on the first item having a higher total support than the second item.

In some variations, the first node may be connected to a root node of the frequent pattern (FP) growth tree. A third node corresponding to the second item may be connected to the root node of the frequent pattern growth tree in order to insert a second transaction included in the supplier data in which the second item has a highest total support.

In some variations, the operations may further include: generating, based at least on the frequent pattern growth tree, a conditional pattern base tree including, for each item of the plurality of items included in the supplier data, a conditional pattern base including one or more items in each path to reach a node corresponding to the item in the frequent pattern growth tree; and identifying, based at least on the conditional pattern base tree, the one or more frequent itemsets.

In some variations, the conditional pattern base tree may exclude one or more items that do not satisfy a support threshold by appearing in a threshold quantity of paths.

In some variations, the one or more frequent itemsets may be identified based at least on the one or more frequent itemsets satisfying a support threshold corresponding to a ratio between a first quantity of transactions included the supplier data and a second quantity of transactions containing the supplier.

In some variations, the one or more frequent itemsets may be identified based at least on the one or more frequent itemsets satisfying a confidence threshold corresponding to a ratio between a first quantity of transactions in the supplier data containing the one or more attributes and a second quantity of transactions in the supplier data containing the supplier along with the one or more attributes.

In some variations, the user input may further specify a confidence threshold and/or a support threshold.

In some variations, the supplier data may include a plurality of contracts and/or sourcing events.

In another aspect, there is provided a method for machine learning enabled data association. The method may include: receiving a user input specifying one or more attributes; in response to the receiving the user input, applying a machine learning model to identify, within a supplier data stored in a database, one or more frequent itemsets containing the one or more attributes; identifying, based at least on the one or more frequent itemsets, a supplier having the one or more attributes; and generating a recommendation including the supplier having the one or more attributes.

In some variations, one or more features disclosed herein including the following features can optionally be included in any feasible combination. The machine learning model may include a frequent pattern (FP) growth tree.

In some variations, the method may further include: generating, based at least on the supplier data, a head table that includes, for each item of a plurality of items included in the supplier data, a total support corresponding to a quantity of transactions including the item; and generating, based at least on the head table, the frequent pattern (FP) growth tree, the frequent pattern growth tree being generated through a single pass of the supplier data included in the database.

In some variations, the generating of the frequent pattern growth tree may includes inserting, for a first transaction included in the supplier data, a first node for a first item included in the transaction and a second node for a second item included in the transaction. The first node may be inserted before the second node based at least on the first item having a higher total support than the second item. The first node may be connected to a root node of the frequent pattern (FP) growth tree. A third node corresponding to the second item may be connected to the root node of the frequent pattern growth tree in order to insert a second transaction included in the supplier data in which the second item has a highest total support.

In some variations, the method may further include: generating, based at least on the frequent pattern growth tree, a conditional pattern base tree including, for each item of the plurality of items included in the supplier data, a conditional pattern base including one or more items in each path to reach a node corresponding to the item in the frequent pattern growth tree; and identifying, based at least on the conditional pattern base tree, the one or more frequent itemsets.

In some variations, the one or more frequent itemsets may be identified based at least on the one or more frequent itemsets satisfying a support threshold corresponding to a ratio between a first quantity of transactions included the supplier data and a second quantity of transactions containing the supplier.

In some variations, the one or more frequent itemsets may be identified based at least on the one or more frequent itemsets satisfying a confidence threshold corresponding to a ratio between a first quantity of transactions in the supplier data containing the one or more attributes and a second quantity of transactions in the supplier data containing the supplier along with the one or more attributes.

In another aspect, there is provided a computer program product including a non-transitory computer readable medium storing instructions. The instructions may cause operations may executed by at least one data processor. The operations may include: receiving a user input specifying one or more attributes; in response to the receiving the user input, applying a machine learning model to identify, within a supplier data stored in a database, one or more frequent itemsets containing the one or more attributes; identifying, based at least on the one or more frequent itemsets, a supplier having the one or more attributes; and generating a recommendation including the supplier having the one or more attributes.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts an example of a user interface, in accordance with some example embodiments;

FIG. 4 depicts a flowchart illustrating an example of a process for machine learning enabled data association, in accordance with some example embodiments;

DETAILED DESCRIPTION

Enterprise software applications may provide a variety of procurement and supply chain management solutions including enterprise resource planning (ERP) and supplier lifecycle management (SLM). For example, as a part of creating a contract with a supplier, corresponding supplier data may be added to a contract workspace. Alternatively and/or additionally, supplier data may collected when one or more suppliers are invited to participate in a sourcing event. Supplier data may include various attributes associated with a supplier including, for example, one or more commodities that the supplier can provide, one or more regions where the supplier can provide the commodities, and one or more departments to which the supplier can supply the commodities. However, conventional enterprise procurement applications are unable to leverage the abundance of supplier data collected from numerous contract workspaces and sourcing events. Instead, conventional enterprise procurement applications merely support supplier selection through the application of filter conditions such as region, commodity, department, and/or the like. As such, new contracts and sourcing events are created without mining the existing contracts and sourcing events for intelligence identifying the best qualified suppliers.

In some example embodiments, a procurement engine may be configured to data mine a database including supplier data associated with various contracts and sourcing events. For example, the procurement engine may apply a machine learning model to generate one or more association rules linking suppliers and various attributes such as commodity, region, department, and/or the like. The machine learning model may be a frequent pattern (FP) growth tree configured to identify, through a single scan of the supplier data associated with various contracts and sourcing events, frequent itemsets including suppliers that co-occur at an above-threshold frequency with various attributes such as commodity, region, department, and/or the like. One or more association rules may be generated by at least mining, from a corresponding conditional frequent pattern (FP) tree, one or more itemsets satisfying a support threshold and/or a confidence threshold. In response to a user input specifying one or more attributes, the procurement engine may apply the one or more association rules to identify a supplier having the one or more specified attributes.

Figure 1:
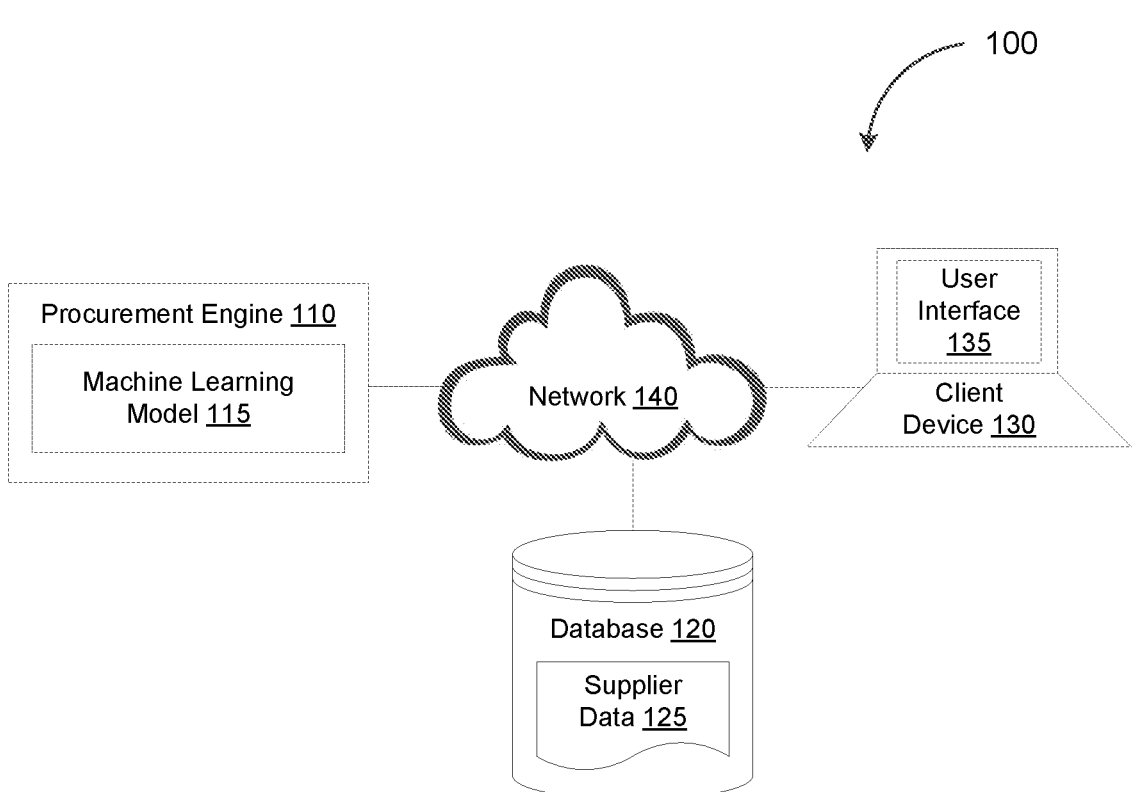
FIG. 1 depicts a system diagram illustrating an example of a procurement system, in accordance with some example embodiments.

FIG. 1 depicts a system diagram illustrating an example of a procurement system 100, in accordance with some example embodiments. Referring to FIG. 1, the procurement system 100 may include a procurement engine 110, a database 120, and a client device 130. The procurement engine 110, the database 120, and the client device 130 may be communicatively coupled via a network 140. The client device 130 may be a processor-based device including, for example, a smartphone, a tablet computer, a wearable apparatus, a virtual assistant, an Internet-of-Things (IoT) appliance, and/or the like. The database 120 may be a relational database, a non-structured query language (NoSQL) database, an in-memory database, a graph database, a key-value store, a document store, and/or the like. The network 140 may be a wired network and/or a wireless network including, for example, a wide area network (WAN), a local area network (LAN), a virtual local area network (VLAN), a public land mobile network (PLMN), the Internet, and/or the like.

Referring again to FIG. 1, the database 120 may store a supplier data 125, which may be associated with numerous contracts and/or sourcing events. For example, the supplier data 125 may be collected as a part of creating a contract with a supplier and/or inviting a supplier to participate in a sourcing event. The supplier data 125 may include, for each supplier, various attributes such as one or more commodities that the supplier can provide, one or more regions where the supplier can provide the commodities, and one or more departments to which the supplier can supply the commodities. In some example embodiments, the procurement engine 110 may perform association rule learning in order to identify one or more relationships present within the supplier data 125 stored in the database 120. As used herein, an association rule may be an implication in the form $X \Rightarrow Y$, wherein X is an antecedent and Y is a consequence. It should be appreciated that the antecedent X and the consequence Y may each be a subset of I (e.g., $X \subseteq I$ and $Y \subseteq I$) and $\varphi$ may denote the intersection between the antecedent X and the consequence Y (e.g., $X \cap Y = \varphi$). An association rule $X \Rightarrow Y$ may have a support s in the transaction set T if an s-quantity (e.g., an s percentage) of transactions in the transaction set T contains the union between the antecedent X and the consequence Y (e.g., $\text{support}(X \Rightarrow Y) = P(X \cup Y)$). Moreover, the association rule $X \Rightarrow Y$ holds in the transaction set T with a confidence c if a c-quantity (e.g., a c percentage) of transactions in the transaction set T containing the antecedent X also contains the consequence Y (e.g., confidence $(X \Rightarrow Y) = P(Y|X)$).

In some example embodiments, the procurement engine 110 may receive, from the client device 130, a user input specifying one or more attributes including, for example, a commodity, a region, a department, and/or the like. The procurement engine 110 may respond to the user input by applying one or more association rules to identify a supplier having the one or more specified attributes. In order to generate the one or more association rules, the procurement engine 110 may apply a machine learning model 115. For example, the machine learning model 115 may be a frequent pattern (FP) growth tree configured to identify, through a single scan of the supplier data 125 stored in the database 120, frequent itemsets including suppliers that co-occur at an above-threshold frequency with various attributes such as commodity, region, department, and/or the like. Moreover, the procurement engine 110 may mine the one or more association rules from a corresponding conditional frequent pattern (FP) tree. For instance, the one or more association rules may correspond to frequent itemsets satisfying one or more of a support threshold and/or a confidence threshold.

Figure 2A:
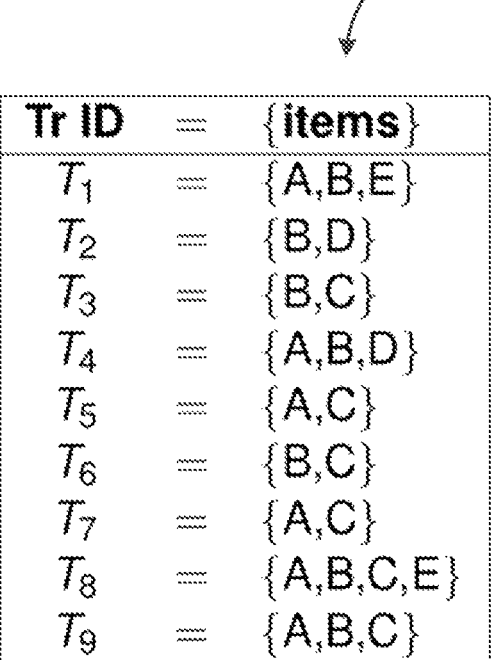
FIG. 2A depicts an example of supplier data, in accordance with some example embodiments.

FIG. 2A depicts an example of the supplier data 125 stored in the database 120. As shown in FIG. 2A, the supplier data 125 may include one or more transactions (e.g., transactions $T_1$, $T_2$, $T_3$, ..., $T_9$), each of which corresponding to a contract or a sourcing event. Moreover, as shown in FIG. 2A, each transaction may be associated with one or more items (e.g., items A, B, C, D, E) corresponding to a supplier and one or more attributes such as a commodity, a region, and/or a department. In the example of the supplier data 125 shown in FIG. 2A, for example, transaction $T_8$ may correspond to a contract or a sourcing event in which a supplier A provides a commodity B in a region C for a department E.

Figure 2B:
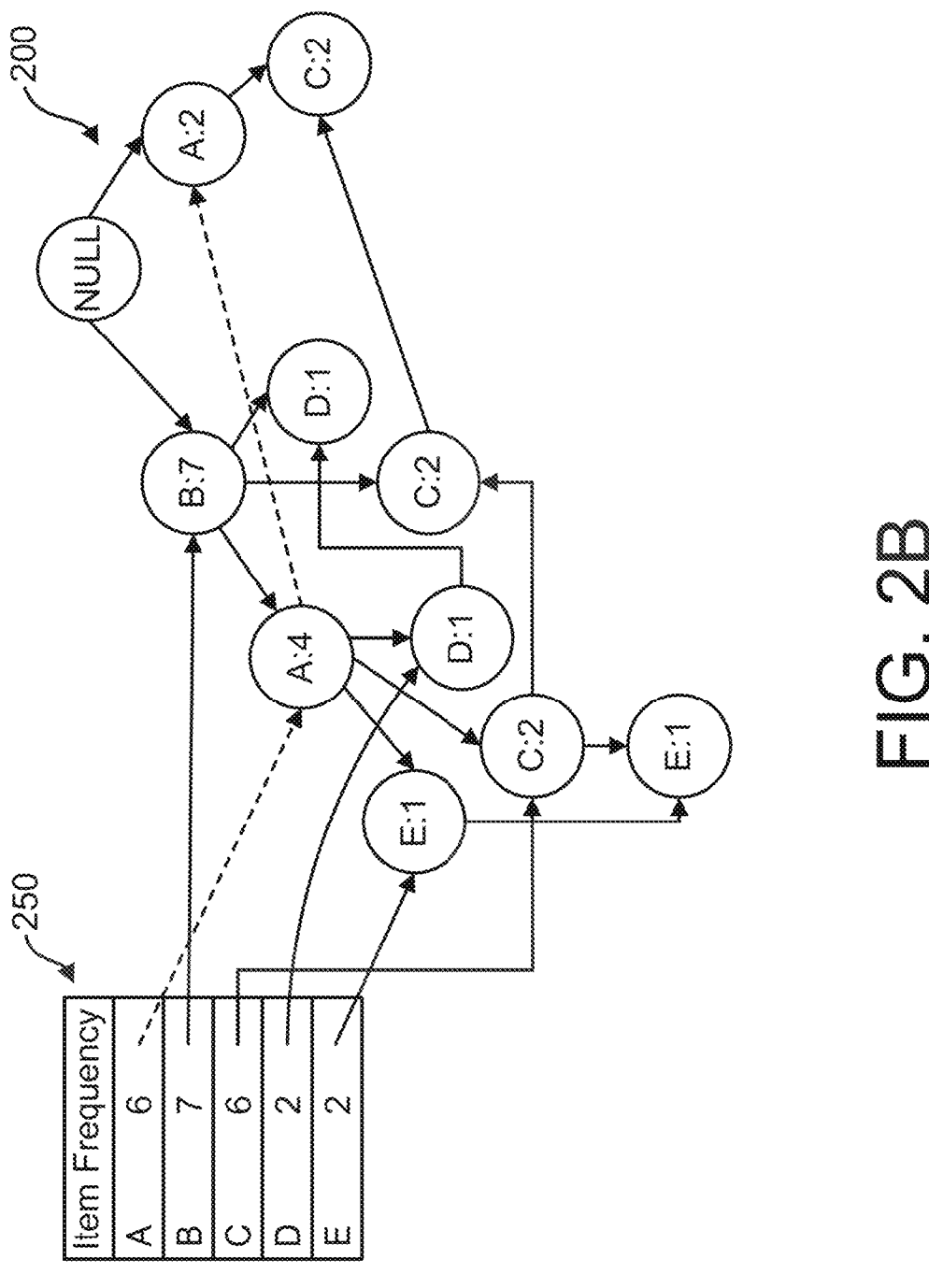
FIG. 2B depicts an example of a condition pattern base tree, in accordance with some example embodiments.

FIG. 2B depicts an example of a frequent pattern (FP) growth tree 200 constructed by the procurement engine 110 based on the example of the supplier data 125 shown in FIG. 2A. As shown in FIG. 2B, the procurement engine 110 may first construct a head table 250 that includes, for each item included in the supplier data 125 (e.g., items A, B, C, D, E), a total support corresponding to the quantity of transactions including the item. For example, the head table 250 shows that item A has a total support of six because item A appears in six transactions in the supplier data 125 (e.g., transactions $T_1$, $T_4$, $T_5$, $T_7$, $T_8$, and $T_9$).

The procurement engine 110 may generate, based on each transaction included in the supplier data 125 and the total support for each item included in the head table 250, the frequent pattern (FP) growth tree 200. For example, for the first transaction $T_1$ included in the supplier data 125, the procurement engine 110 may add a node corresponding to each of the items A, B, and E included in the first transaction $T_1$ in an order determined by the total support for each item. Accordingly, a first node corresponding to item B may be added to the frequent pattern (FP) growth tree before a second node corresponding to item A based at least on item B having a higher total support than item A. The first node corresponding to item B may be connected to a null root node of the frequent pattern (FP) growth tree 200 while the second node corresponding to item A is connected to the first node. Contrastingly, for the fifth transaction $T_5$, the procurement engine 110 may insert item A first because item A has the highest total support in the fifth transaction $T_5$. Moreover, the procurement engine 110 may insert an additional node corresponding to item A because the existing node corresponding to item A is not immediately reachable from the root node of the frequent pattern (FP) growth tree 200.

As shown in FIG. 2B, each node in the frequent pattern (FP) growth tree may be associated with a count, which may be incremented each time a corresponding node is included in a transaction inserted into the frequent pattern (FP) growth tree. For example, the count associated with the first node corresponding to item B, the second node corresponding to item A, and a third node corresponding to item E may be incremented based on the addition of the corresponding first transaction $T_1$. Meanwhile, to insert the second transaction $T_2$ included in the supplier data 125, the procurement engine 110 may increment the count associated with the first node corresponding to item B before connecting the first node to a fourth node corresponding to item D.

In some example embodiments, the procurement engine 110 may generate, based at least on the frequent pattern (FP) growth tree 200, a corresponding conditional pattern base tree including one or more conditional pattern bases for each item included in the supplier data 125 (e.g., items A, B, C, D, E). For example, the conditional pattern base for item E (e.g., {{B, A: 1}, {B, A, C: 1}} may correspond to the two possible paths from the root node of the frequent pattern (FP) growth tree 200 to the node corresponding to item E. The corresponding conditional frequent pattern (FP) tree for item E (e.g., ⟨ A: 2, B: 2⟩ ) may include the items that satisfy a support threshold (e.g., items A and B) but exclude those that do not (e.g., item C). This minimum support threshold may be defined based on one or more user inputs received, for example, from the client device 130.

The procurement engine 110 may determine, based at least on the conditional frequent pattern (FP) tree, one or more itemsets in which item E co-occurs with one or both of items A and B. For example, these itemsets may correspond to contracts or sourcing events that involve the department E along with the supplier A and/or the commodity B. The association rules mined from the conditional frequent pattern (FP) tree may corresponding to those itemsets satisfying a support threshold and/or a confidence threshold defined, for example, by one or more user inputs received from the client device 130. For instance, the support threshold may impose a first minimum threshold on a first ratio between a first quantity of transactions included the supplier data 125 and a second quantity of transactions containing item E. Meanwhile, the confidence threshold may impose a second minimum threshold on a second ratio between a first quantity of transactions in the supplier data 125 containing items A and/or B and a second quantity of transactions in the supplier data 125 containing item E along with items A and/or B.

In some example embodiments, the procurement engine 110 may receive, from the client device 130, a user input specifying one or more attributes such as a commodity, a region, and/or a department. FIG. 3 depicts an example of a user interface 135, which may be displayed at the client device 130 to receive the user input specifying the one or more attributes. The procurement engine 110 may respond to the user input by applying the one or more association rules to identify a supplier having the one or more attributes. For example, the user input may specify the commodity B and/or the department E, in which case the procurement engine 110 may apply the one or more association rules to identify supplier A as suitable for providing the commodity B to the department E. In the example of the user interface 135 shown in FIG. 3, the procurement engine 110 may update the user interface 135 to display supplier A in response to the user input specifying the commodity B and/or the department E.

FIG. 4 depicts a flowchart illustrating an example of a process 400 for machine learning enabled data association, in accordance with some example embodiments. Referring to FIGS. 1-4, the process 400 may be performed by the procurement engine 110 in order to identify, for example, a supplier having one or more specified attributes such as a commodity, a region, a department, and/or the like.

At 402, the procurement engine 110 may receive a user input specifying one or more attributes. In some example embodiments, the procurement engine 110 may receive, from the client device 130, a user input specifying a commodity, a region, and/or a department. For example, the procurement engine 110 may receive, from the client device 130, a user input specifying the commodity B and/or the department E.

At 404, the procurement engine 110 may respond to receiving the user input by applying a machine learning model to identify, within supplier data stored in a database, one or more frequent itemsets containing the one or more attributes. In some example embodiments, the procurement engine 110 may apply, to the supplier data 125 stored in the database 120, the machine learning model 115, which may be a frequent pattern (FP) growth tree configured to identify, through a single scan of the supplier data 125 stored in the database 120, frequent itemsets including suppliers that co-occur at an above-threshold frequency with various attributes such as commodity, region, department, and/or the like. The procurement engine 110 may mine the one or more association rules from a corresponding conditional frequent pattern (FP) tree. For instance, the one or more association rules may correspond to frequent itemsets satisfying a support threshold that imposes a first minimum threshold on a first ratio between a first quantity of transactions included the supplier data 125 and a second quantity of transactions containing the specified attributes. Alternatively and/or additionally, the one or more association rules may correspond to frequent itemsets satisfying a confidence threshold imposing a second minimum threshold on a second ratio between a first quantity of transactions in the supplier data 125 containing the specified attributes and a second quantity of transactions in the supplier data 125 containing each candidate supplier along with the specified attributes.

In the example in which the specified attributes include the commodity B and/or the department E, the support threshold for an association rule may impose a first minimum threshold on a first ratio between a first quantity of transactions included the supplier data 125 and a second quantity of transactions containing item E. Meanwhile, the confidence threshold may impose a second minimum threshold on a second ratio between a first quantity of transactions in the supplier data 125 containing items A and/or B and a second quantity of transactions in the supplier data 125 containing item E along with items A and/or B.

At 406, the procurement engine 110 may identify, based at least on the one or more frequent itemsets, a supplier having the one or more attributes. In some example embodiments, the procurement engine 110 may apply the one or more association rules mined from the frequent pattern (FP) growth tree to identify one or more suppliers that satisfy the attributes specified in the user input received from the client device 130. For example, the procurement engine 110 may apply the one or more association rules to identify supplier A as suitable for providing the commodity B to the department E.

At 408, the procurement engine 110 may generate a recommendation including the supplier having the one or more attributes. For example, the procurement engine 110 may generate the recommendation including the supplier having the one or more attributes by at least updating the user interface 135 displayed at the client device 130 to include the supplier. In the example of the user interface 135 shown in FIG. 3, for instance, the procurement engine 110 may update the user interface 135 to display supplier A in response to the user input specifying the commodity B and/or the department E.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a user input specifying one or more attributes; in response to the receiving the user input, applying a machine learning model to identify, within a supplier data stored in a database, one or more frequent itemsets containing the one or more attributes; identifying, based at least on the one or more frequent itemsets, a supplier having the one or more attributes; and generating a recommendation including the supplier having the one or more attributes.

Example 2: The system of example 1, wherein the machine learning model comprises a frequent pattern (FP) growth tree.

Example 3: The system of example 2, wherein the operations further comprise: generating, based at least on the supplier data, a head table that includes, for each item of a plurality of items included in the supplier data, a total support corresponding to a quantity of transactions including the item; and generating, based at least on the head table, the frequent pattern (FP) growth tree.

Example 4: The system of example 3, wherein the frequent pattern growth tree is generated through a single pass of the supplier data included in the database.

Example 5: The system of any one of examples 3 to 4, wherein the generating of the frequent pattern growth tree includes inserting, for a first transaction included in the supplier data, a first node for a first item included in the transaction and a second node for a second item included in the transaction, and wherein the first node is inserted before the second node based at least on the first item having a higher total support than the second item.

Example 6: The system of example 5, wherein the first node is connected to a root node of the frequent pattern (FP) growth tree, and wherein a third node corresponding to the second item is connected to the root node of the frequent pattern growth tree in order to insert a second transaction included in the supplier data in which the second item has a highest total support.

Example 7: The system of any one of examples 3 to 6, wherein the operations further comprise: generating, based at least on the frequent pattern growth tree, a conditional pattern base tree including, for each item of the plurality of items included in the supplier data, a conditional pattern base including one or more items in each path to reach a node corresponding to the item in the frequent pattern growth tree; and identifying, based at least on the conditional pattern base tree, the one or more frequent itemsets.

Example 8: The system of example 7, wherein the conditional pattern base tree excludes one or more items that do not satisfy a support threshold by appearing in a threshold quantity of paths.

Example 9: The system of any one of examples 7 to 8, wherein the one or more frequent itemsets are identified based at least on the one or more frequent itemsets satisfying a support threshold corresponding to a ratio between a first quantity of transactions included the supplier data and a second quantity of transactions containing the supplier.

Example 10: The system of any one of examples 7 to 9, wherein the one or more frequent itemsets are identified based at least on the one or more frequent itemsets satisfying a confidence threshold corresponding to a ratio between a first quantity of transactions in the supplier data containing the one or more attributes and a second quantity of transactions in the supplier data containing the supplier along with the one or more attributes.

Example 11: The system of any one of examples 1 to 10, wherein the user input further specifies a confidence threshold and/or a support threshold.

Example 12: The system of any one of examples 1 to 11, wherein the supplier data includes a plurality of contracts and/or sourcing events.

Example 13: A computer-implemented method, comprising: receiving a user input specifying one or more attributes; in response to the receiving the user input, applying a machine learning model to identify, within a supplier data stored in a database, one or more frequent itemsets containing the one or more attributes; identifying, based at least on the one or more frequent itemsets, a supplier having the one or more attributes; and generating a recommendation including the supplier having the one or more attributes.

Example 14: The method of example 13, wherein the machine learning model comprises a frequent pattern (FP) growth tree.

Example 15: The method of example 14, further comprising: generating, based at least on the supplier data, a head table that includes, for each item of a plurality of items included in the supplier data, a total support corresponding to a quantity of transactions including the item; and generating, based at least on the head table, the frequent pattern (FP) growth tree, the frequent pattern growth tree being generated through a single pass of the supplier data included in the database.

Example 16: The method of example 15, wherein the generating of the frequent pattern growth tree includes inserting, for a first transaction included in the supplier data, a first node for a first item included in the transaction and a second node for a second item included in the transaction, wherein the first node is inserted before the second node based at least on the first item having a higher total support than the second item, wherein the first node is connected to a root node of the frequent pattern (FP) growth tree, and wherein a third node corresponding to the second item is connected to the root node of the frequent pattern growth tree in order to insert a second transaction included in the supplier data in which the second item has a highest total support.

Example 17: The method of any one of examples 15 to 16, further comprising: generating, based at least on the frequent pattern growth tree, a conditional pattern base tree including, for each item of the plurality of items included in the supplier data, a conditional pattern base including one or more items in each path to reach a node corresponding to the item in the frequent pattern growth tree; and identifying, based at least on the conditional pattern base tree, the one or more frequent itemsets.

Example 18: The method of example 17, wherein the one or more frequent itemsets are identified based at least on the one or more frequent itemsets satisfying a support threshold corresponding to a ratio between a first quantity of transactions included the supplier data and a second quantity of transactions containing the supplier.

Example 19: The method of any one of examples 17 to 18, wherein the one or more frequent itemsets are identified based at least on the one or more frequent itemsets satisfying a confidence threshold corresponding to a ratio between a first quantity of transactions in the supplier data containing the one or more attributes and a second quantity of transactions in the supplier data containing the supplier along with the one or more attributes.

Example 20: A non-transitory computer readable medium storing instructions, which when executed by at least one data processor, result in operations comprising: receiving a user input specifying one or more attributes; in response to the receiving the user input, applying a machine learning model to identify, within a supplier data stored in a database, one or more frequent itemsets containing the one or more attributes; identifying, based at least on the one or more frequent itemsets, a supplier having the one or more attributes; and generating a recommendation including the supplier having the one or more attributes.

Figure 5:
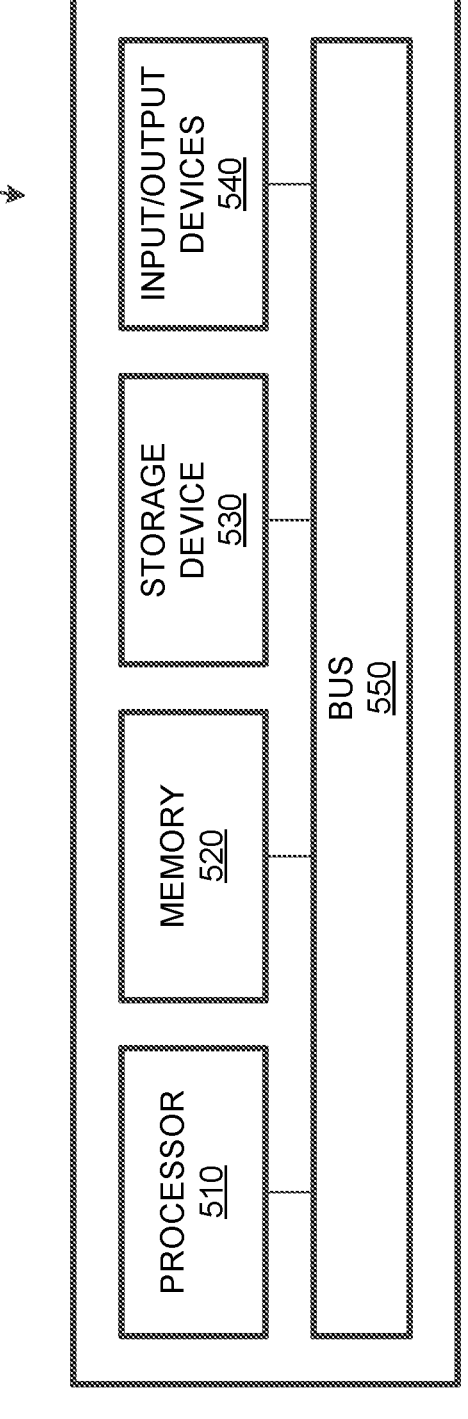
FIG. 5 depicts a block diagram illustrating an example of a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1-5, the computing system 500 can be used to implement the procurement engine 110 and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the procurement engine 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one processor; and
at least one memory including program code which when executed by the at least one processor provides operations comprising:
  receiving a user input specifying one or more attributes;
  in response to the receiving the user input, applying a machine learning model to identify, within a supplier data stored in a database, one or more frequent itemsets containing the one or more attributes, wherein the machine learning model comprises a frequent pattern tree, wherein the frequent pattern tree is generated by at least
    generating, based at least on the supplier data, a head table that includes, for each item of a plurality of items included in the supplier data, a total support indicative of a quantity of transactions including a corresponding item, and
    generating, based at least on the head table, the frequent pattern tree;
  generating, based on the frequent pattern tree, a conditional pattern base tree including, for each item of the plurality of items included in the supplier data, a conditional pattern base including one or more items in each path to reach a node corresponding to the item in the frequent pattern tree;
  identifying, based on the conditional pattern base tree, the one or more frequent itemsets based on the one or more frequent itemsets satisfying a support threshold and a confidence threshold;
  identifying, using at least the frequent pattern tree including the head table and based at least on the one or more frequent itemsets, a supplier having the one or more attributes; and
  generating a recommendation including the supplier having the one or more attributes,
  wherein the support threshold corresponds to a ratio between a first quantity of transactions included in the supplier data and a second quantity of transactions containing a first item, and
  wherein the confidence threshold corresponds to a ratio between a third quantity of transactions included in the supplier data containing one or more second items and a fourth quantity of transactions containing the first item and the one or more second items.

2. The system of claim 1, wherein the frequent pattern tree is generated through a single pass of the supplier data included in the database.

3. The system of claim 1, wherein the generating of the frequent pattern tree includes inserting, for a first transaction included in the supplier data, a first node for a first item included in the transaction and a second node for a second item included in the transaction, and wherein the first node is inserted before the second node based at least on the first item having a higher total support than the second item.

4. The system of claim 3, wherein the first node is connected to a root node of the frequent pattern tree, and wherein a third node corresponding to the second item is connected to the root node of the frequent pattern tree in order to insert a second transaction included in the supplier data in which the second item has a highest total support.

5. The system of claim 1, wherein the conditional pattern base tree excludes one or more items that do not satisfy the support threshold by appearing in a threshold quantity of paths.

6. The system of claim 1, wherein the one or more frequent itemsets further contain one or more suppliers that co-occur with the one or more attributes at a frequency that exceeds a threshold.

7. The system of claim 1, wherein the user input further specifies the confidence threshold and the support threshold.

8. The system of claim 1, wherein the supplier data includes a plurality of contracts and sourcing events.

9. A computer-implemented method, comprising:
receiving a user input specifying one or more attributes;
in response to the receiving the user input, applying a machine learning model to identify, within a supplier data stored in a database, one or more frequent itemsets containing the one or more attributes, wherein the machine learning model comprises a frequent pattern tree, wherein the frequent pattern tree is generated by at least
  generating, based at least on the supplier data, a head table that includes, for each item of a plurality of items included in the supplier data, a total support indicative of a quantity of transactions including a corresponding item, and
  generating, based at least on the head table, the frequent pattern tree;

generating, based on the frequent pattern tree, a conditional pattern base tree including, for each item of the plurality of items included in the supplier data, a conditional pattern base including one or more items in each path to reach a node corresponding to the item in the frequent pattern tree;

identifying, based on the conditional pattern base tree, the one or more frequent itemsets based on the one or more frequent itemsets satisfying a support threshold and a confidence threshold;

identifying, using at least the frequent pattern tree including the head table and based at least on the one or more frequent itemsets, a supplier having the one or more attributes; and generating a recommendation including the supplier having the one or more attributes, wherein the support threshold corresponds to a ratio between a first quantity of transactions included in the supplier data and a second quantity of transactions containing a first item, and wherein the confidence threshold corresponds to a ratio between a third quantity of transactions included in the supplier data containing one or more second items and a fourth quantity of transactions containing the first item and the one or more second items.

10. The method of claim 9, wherein the generating of the frequent pattern tree includes inserting, for a first transaction included in the supplier data, a first node for a first item included in the transaction and a second node for a second item included in the transaction, wherein the first node is inserted before the second node based at least on the first item having a higher total support than the second item, wherein the first node is connected to a root node of the frequent pattern tree, and wherein a third node corresponding to the second item is connected to the root node of the frequent pattern tree in order to insert a second transaction included in the supplier data in which the second item has a highest total support.

11. A non-transitory computer readable medium storing instructions, which when executed by at least one data processor, result in operations comprising:

receiving a user input specifying one or more attributes;

in response to the receiving the user input, applying a machine learning model to identify, within a supplier data stored in a database, one or more frequent itemsets containing the one or more attributes, wherein the machine learning model comprises a frequent pattern tree, wherein the frequent pattern tree is generated by at least generating, based at least on the supplier data, a head table that includes, for each item of a plurality of items included in the supplier data, a total support indicative of a quantity of transactions including a corresponding item, and generating, based at least on the head table, the frequent pattern tree;

generating, based on the frequent pattern tree, a conditional pattern base tree including, for each item of the plurality of items included in the supplier data, a conditional pattern base including one or more items in each path to reach a node corresponding to the item in the frequent pattern tree;

identifying, based on the conditional pattern base tree, the one or more frequent itemsets based on the one or more frequent itemsets satisfying a support threshold and a confidence threshold;

identifying, using at least the frequent pattern tree including the head table and based at least on the one or more frequent itemsets, a supplier having the one or more attributes; and generating a recommendation including the supplier having the one or more attributes, wherein the support threshold corresponds to a ratio between a first quantity of transactions included in the supplier data and a second quantity of transactions containing a first item, and wherein the confidence threshold corresponds to a ratio between a third quantity of transactions included in the supplier data containing one or more second items and a fourth quantity of transactions containing the first item and the one or more second items.

* * * * *